United States Patent [19]

Fournier et al.

[11] Patent Number: 4,801,112
[45] Date of Patent: Jan. 31, 1989

[54] AIRCRAFT POWER UNIT OF THE TYPE WITH FAIRED BLOWER EQUIPPED WITH A THRUST REVERSER WTH DOORS

[75] Inventors: Alain Fournier, Clamart, France; John F. Kennedy, Walmer, United Kingdom

[73] Assignee: Societe de Construction des Avions Hurel-Dubois, France

[21] Appl. No.: 157,366

[22] Filed: Feb. 17, 1988

[30] Foreign Application Priority Data

Feb. 19, 1987 [FR] France .................. 87 02121

[51] Int. Cl.⁴ .................. F02K 3/06; B64C 15/00
[52] U.S. Cl. .................. 244/110 B; 60/226.2; 239/265.29; 239/265.31
[58] Field of Search .............. 244/110 B, 23 D, 12.5; 239/265.19, 265.23, 265.25, 265.27, 265.29, 265.31; 60/226.2, 228, 230, 232

[56] References Cited

U.S. PATENT DOCUMENTS

| | | | |
|---|---|---|---|
| 3,262,270 | 7/1966 | Beavers | 60/35.54 |
| 3,262,271 | 7/1966 | Beavers | 60/226.2 |
| 3,279,182 | 10/1966 | Helmintoller | 60/226.2 |
| 3,541,794 | 11/1970 | Johnston et al. | 60/226 |
| 4,147,028 | 4/1979 | Rodgers | 239/265.29 |
| 4,382,551 | 5/1983 | Thayer | 239/265.29 |
| 4,410,152 | 10/1983 | Kennedy et al. | 244/110 B |
| 4,485,970 | 12/1984 | Fournier et al. | 244/110 B |
| 4,564,160 | 1/1986 | Vermilye | 244/110 B |

FOREIGN PATENT DOCUMENTS 109-219  5/1984  European Pat. Off. .
2588312  4/1987  France .

Primary Examiner—Joseph F. Peters, Jr.
Assistant Examiner—Rodney Corl
Attorney, Agent, or Firm—W. Thad Adams, III

[57] ABSTRACT

The aircraft propulsive unit having on the one hand, a fixed central structure in the axis of which is housed a gas generator whose nozzle delivers a hot jet and, on the other hand, an upstream fan or blower concentric with the gas generator and rotating inside an annular channel defined by the fixed structure and by a peripheral cowling or fairing with double wall carried by the fixed structure, the blower providing the forced circulation of a cold flow in the channel for improving the performance of the power unit, the fairing being formed of two parts, the upstream one of which is fixed and surrounds the blower, whereas the downstream one is mobile and slides parallel to the axis x—x' of the generator, the propulsive power unit further having a system for reversing the thrust of the cold flow which is formed of pivoting doors having respectively external and internal walls which, in the retracted position of the doors, are aligned respectively with the external and internal walls of the fairing.

The doors are housed in openings of the sliding part of the fairing, defined by annular parts joined together by beams, the doors pivoting about pivots housed in the beams and each door being coupled by at least one link to the fixed central structure so that the backward movement of the sliding part of the fairing causes rotation of the doors, which frees openings and closes the annular channel, the doors projecting radially outwardly of the fairing.

8 Claims, 5 Drawing Sheets

AIRCRAFT POWER UNIT OF THE TYPE WITH FAIRED BLOWER EQUIPPED WITH A THRUST REVERSER WTH DOORS

The present invention relates to aircraft power units using the technology of reversers with pivoting doors.

More precisely, the invention relates to an aircraft power unit of the type comprising, on the one hand, a fixed central structure in the axis of which is housed a gas generator whose nozzle delivers a hot jet and, on the other hand, an upstream fan or blower concentric with the gas generator and rotating inside an annular channel defined by the fixed structure and by a peripheral cowling or fairing with double wall carried by the fixed structure, said blower providing the forced circulation of a cold flow in the channel for improving the performance of the power unit, the fairing being formed of two parts, the upstream one of which is fixed and surrounds the blower, whereas the downstream one is mobile and slides parallel to the axis of the generator, said power unit further comprising a system for reversing the thrust of the cold flow which is formed of pivoting doors having respectively external and internal walls which, in the retracted position of the doors, are aligned respectively with the external and internal walls of the fairing.

This type of propulsive unit is commonly a bypass engine with very high dilution rate and the fixed central structure to which reference was made above, is generally suspended from a mast integral with the aircraft.

The technology of pivoting door reversers is known for example from the EP-A-No. 0043764

In accordance with the invention, the propulsive power unit is characterized in that said doors are housed in openings in the sliding part of the fairing, defined by annular parts joined together by beams, said doors pivoting about pivots housed in said beams and each door being coupled by at least one link to the fixed central structure so that the backward movement of the sliding part of the fairing causes rotation of the doors, which frees openings and closes the annular channel, the doors projecting radially outwardly of the fairing.

It will then be understood that the present invention is distinguished from that described in EP-A-No. 0043764 by the fact that, according to this latter, the fixed and mobile parts of the fairing are not juxtaposed in the cruising flight position, but separated by the retracted doors, the doors are hinged about fixed shafts integral with the fixed fairing part, the doors have only a rotational movement and not a complex movement resulting from translation plus rotation and, finally, the whole structure for controlling the pivoting of the doors is different from that used in accordance with the present invention.

In the type of propulsive power unit to which the invention relates, the peripheral fairing is connected to the fixed structure by a ring of fixed blades situated between the upstream blower and the rear end of the annular channel, the length of the zone of the fairing situated downstream of the ring of fixed blades being relatively short. Reversal of the cold flow from the blower can only be performed in this downstream zone of the fairing. Now, the flow mass to be deflected is considerable because of the section of the annular channel and the dimensions of the reversal well which must be freed to admit this deflected flow must also be considerable and must extend practically over a length substantially equal to the downstream zone of the fairing. If such a reversal well were formed in a one piece fairing, the result would be prejudicial fatigue of this part of the propulsive power unit and the impossibility of maintaining the performances and characteristics required not only for safety in flight but also for correct braking of the aircraft on landing.

The solution proposed by the invention of a fairing whose rear part is movable rearwardly overcomes this problem in a simple, economic and efficient way, whereas the system for coupling the reversal doors by links provides automatic, reliable and very simple control of the opening and closure thereof.

Furthermore, the sliding zone of the fairing is mounted on rails fixed to the mast, itself integral with the airfoil of the aircraft, the translational movement of a sliding part of the fairing being achieved by an actuation system housed partially in the upstream fixed part of the fairing and partially in the beams of the sliding part.

The actuation system may consist more particularly of screw jacks.

In so far as the doors are concerned, their pivoting axis is situated substantially halfway therealong whereas the pivoting links, preferably one for each door, are coupled in the vicinity of the rear edge of each door, i.e. downstream of the pivoting axis, the coupling point being preferably situated at substantially a quarter the length of the door from its rear edge.

It should be noted that in the retracted reversal position, the space between the rear of the fixed part of the fairing and the downstream annular part of the sliding part of the fairing has a length less (by about half) than the total length of the door so that the front of this latter overlaps the fixed fairing part by bearing on a seal provided on the edge of this fixed fairing part. This arrangement is particularly advantageous for it forms a safety measure. In fact, only the downstream part of the door is subjected to the over pressure reigning in the annular channel, which tends to maintain the door closed.

Other advantages and characteristics of the invention will be clear from the following description given by way of non limitative example, with reference to the accompanying drawings in which.

Figure 1:
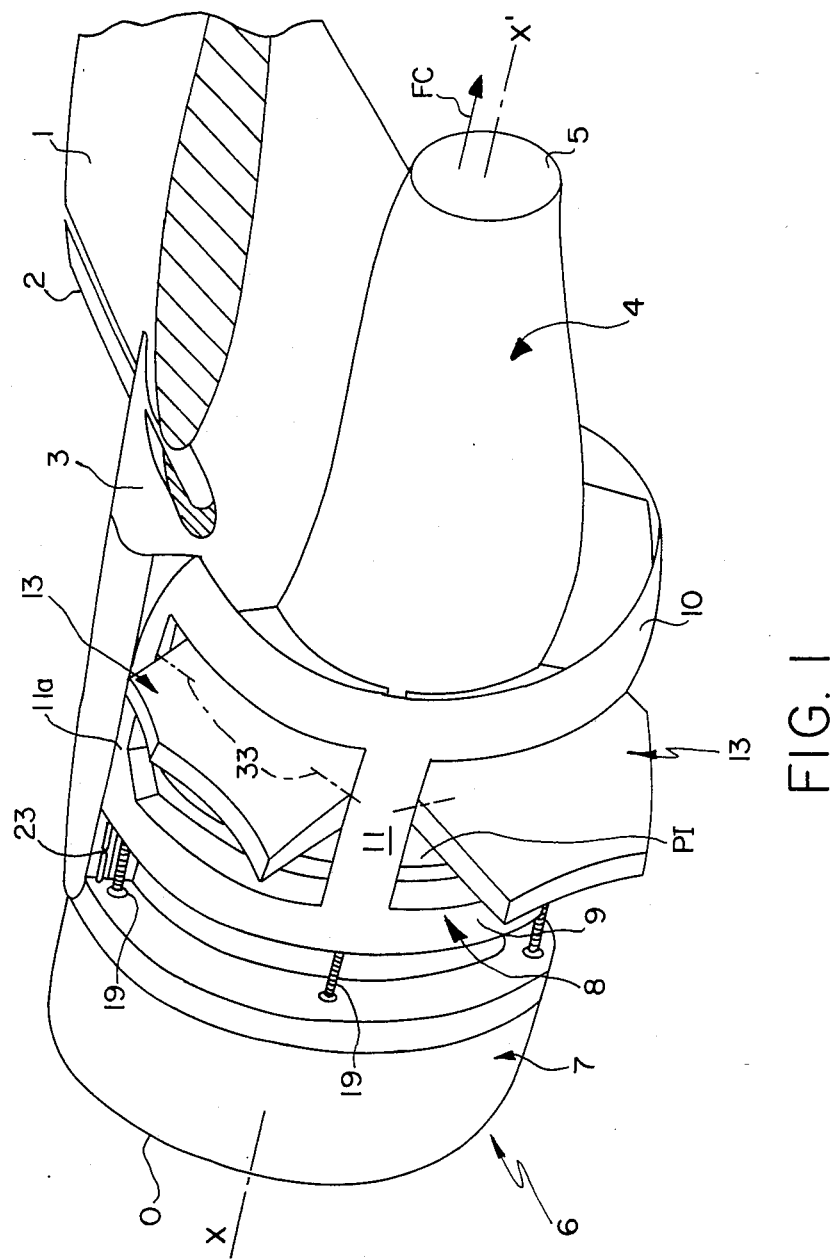
FIG. 1 is a general perspective view of the propulsive power unit of the invention equipped with the reversal system in the active position.
Figure 2:
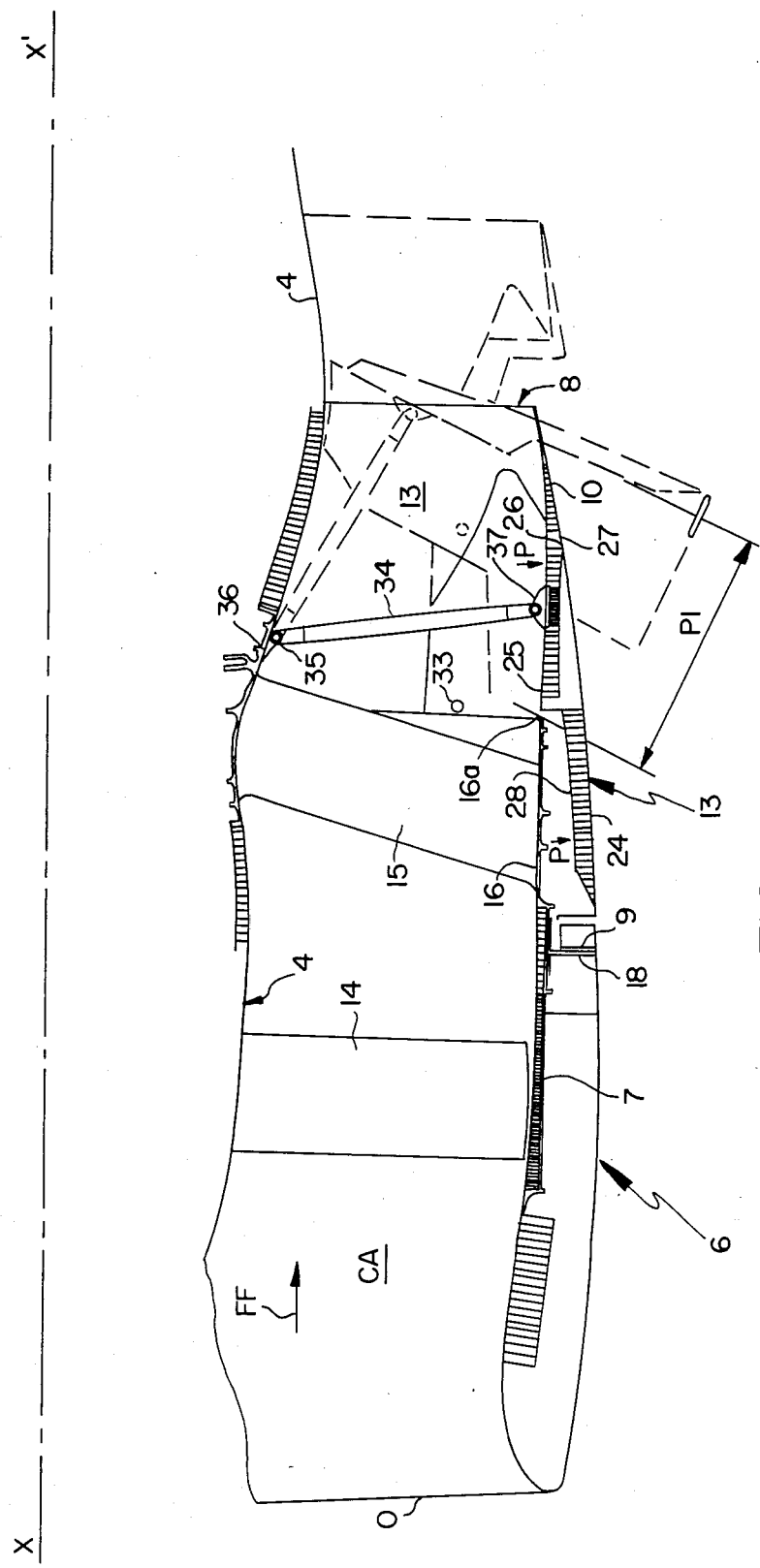
FIG. 2 is a partial sectional view showing the reversal system in its retracted and active position.
Figure 3:
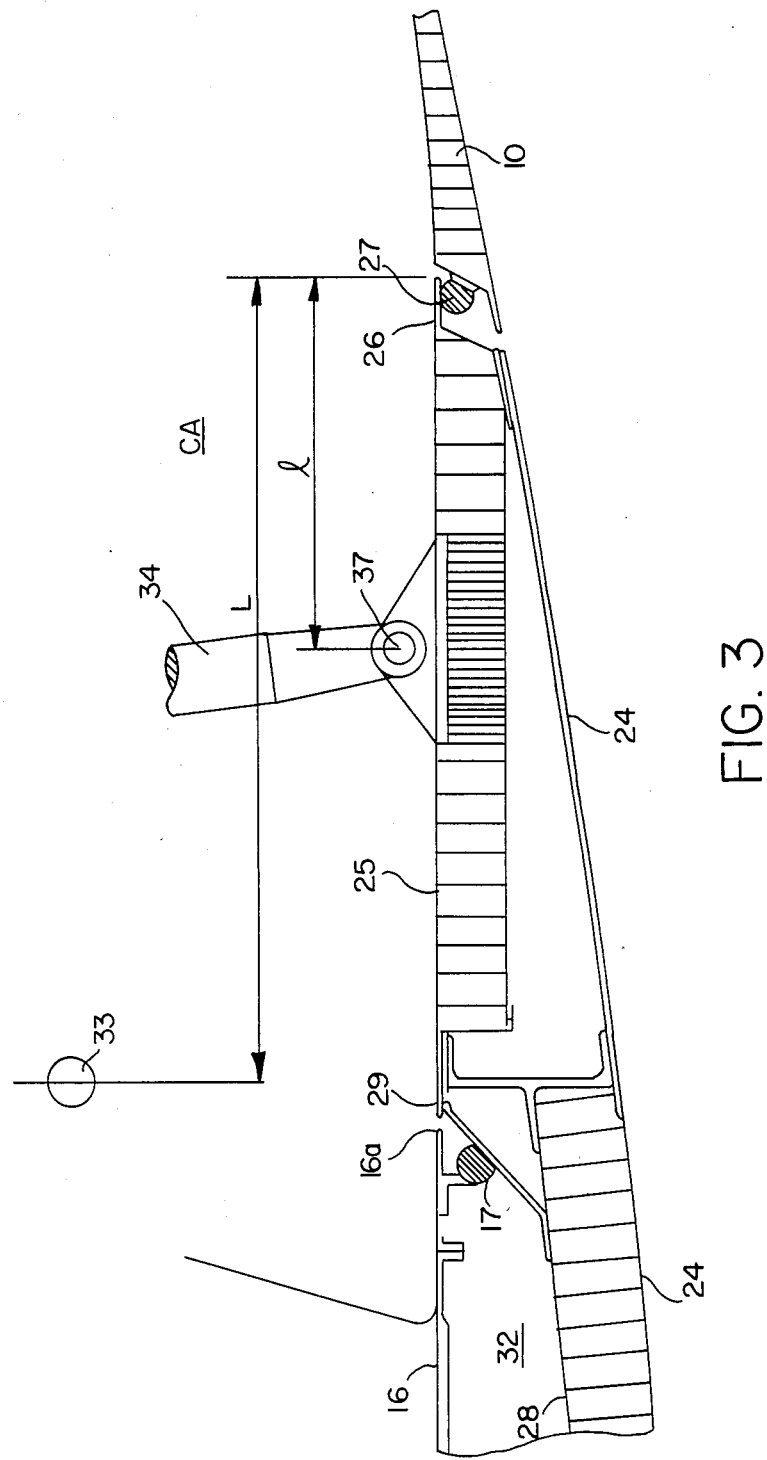
FIG. 3 is a detail view of the door seal.

In FIG. 1, at 1 can be seen a part of the wing of an aircraft with its wing tip 2, under which is fixed, by means of a support mast 3, the propulsive power unit formed of a fixed central structure 4 suspended from mast 3 and containing the gas generator (not shown) situated in the longitudinal axis x—x' of the fixed structure 4 and the fairing designated generally at 6 surrounding the fixed structure while being spaced apart therefrom so that an annular channel CA is formed therebetween (whose inlet orifice is shown at 0) in which a cold flow FF is intended to flow under the action of a blower 14 with rotating blades concentric with the fixed structure (see also FIG. 2). At 5 has been shown the nozzle for injecting the hot gases FC coming from the gas generator.

The fairing 6 is formed of a fixed upstream part 7 attached to the fixed structure 4 by a ring of fixed blades 15 mounted on the internal wall 16 of the fixed part of the fairing, and a mobile downstream part designated generally at 8 and sliding on two rails 23 provided in mast 3.

The sliding fairing part 8 is formed of two annular parts 9 and 10 joined together by beams 11 and 11a parallel to the longitudinal axis x—x' of the motor, forming therebetween openings in which are housed the pivoting doors 13 of a door reversal system. In the example shown, there are four doors.

As can be seen in particular in FIG. 2, the internal wall 16 of the fixed fairing part 7 extends downstream beyond the fixed blades 15 as far as the edge designated at 16a, whereas the external wall of this fixed part 7 is interrupted upstream of edge 16a at the level of the annular frame 18 which makes this fixed part 7 rigid.

Figure 4:
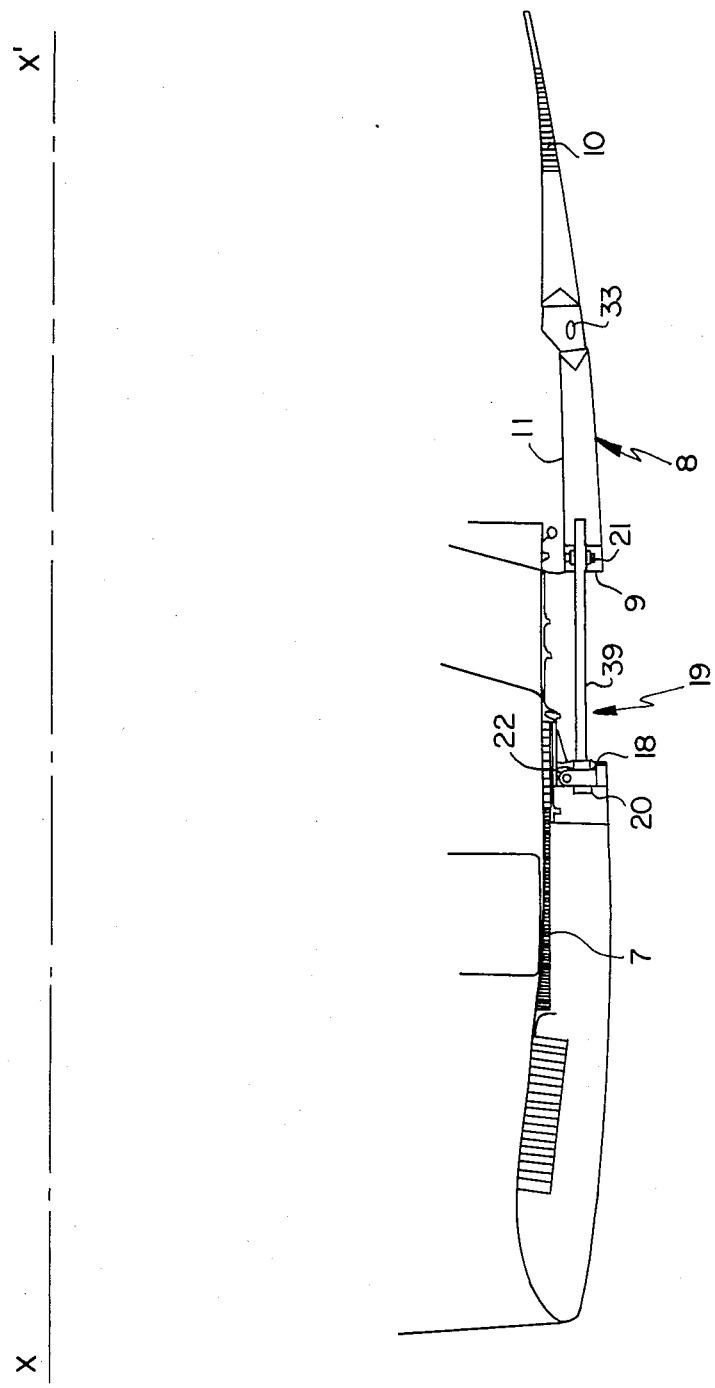
FIG. 4 shows in section the detail of the system for driving the mobile part of the fairing.
Figure 5:
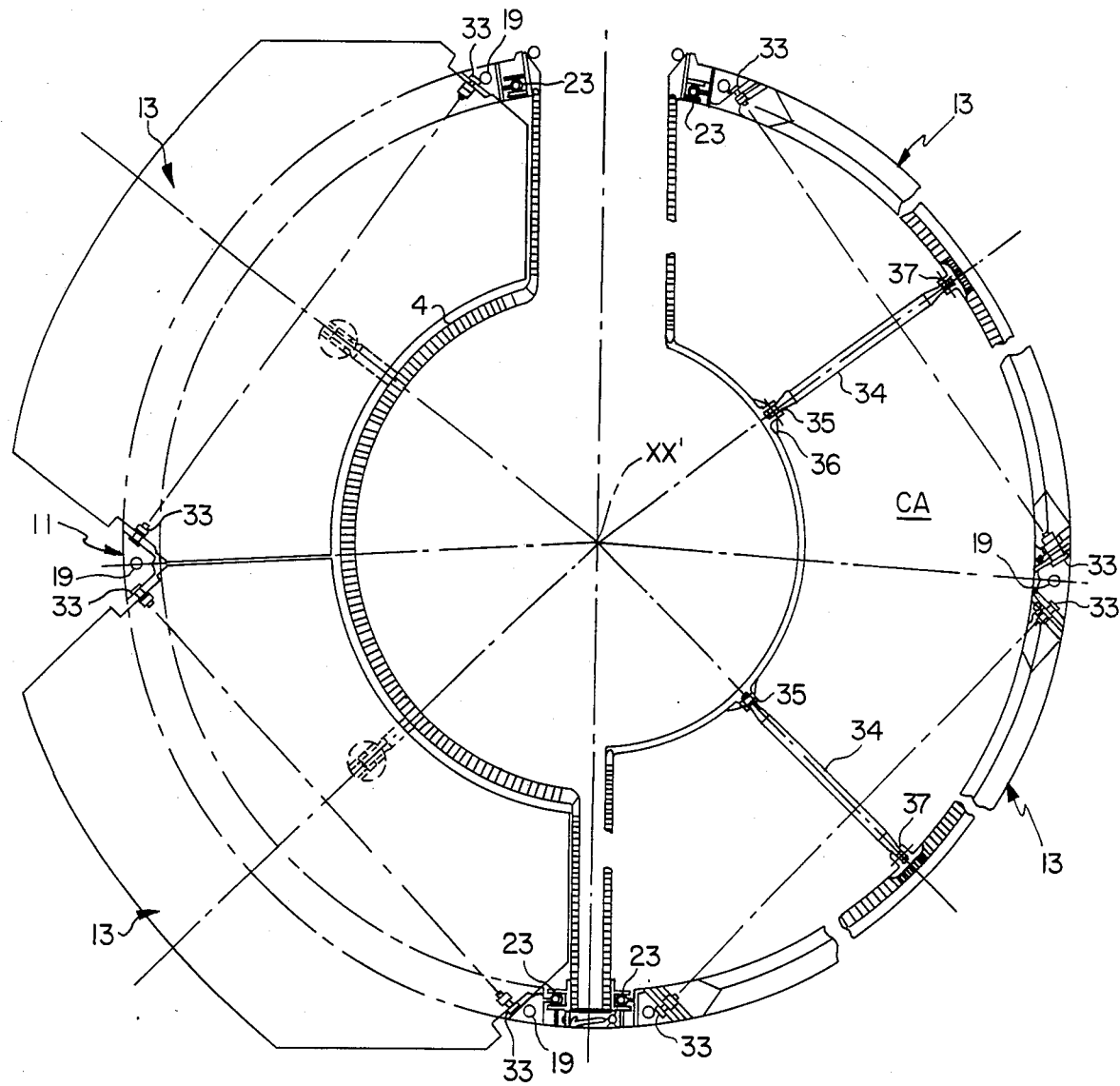
FIG. 5 is a schematical view of the rear with partial sections showing on the left the doors retracted and on the right the doors opened out.

As shown in FIG. 4, the translational movement of the sliding part 8 of the fairing is controlled by a drive system formed in the example shown, without it being a limitative means, by a series of screw jacks 19. The head 20 of each jack is housed in frame 18, coupled for rotation to a drive sytem 22 and immobilized in translation. The screw body passes through the annular part 9 of the sliding fairing part and extends into one of beams 11. A nut 21, locked against rotation, has the screw 39 passing therethrough. The jacks whose operation is synchronized extend substantially parallel to the axis x—x' of the power propulsive unit.

Each door 13, has the general shape of a portion of truncated cone, comprises an external wall 24 which, as can be seen in FIG. 2, is aligned with the outer wall of the fairing in the closed door position and an internal wall with a hump backed form, i.e. having two slopes.

The rear part 25 of this internal wall (shown approximately halfway along the door) is intended to be positioned exactly in the extension of the internal wall 16 of the fairing, the rear edge 26 of the door abutting against seal 27 carried by the rear part 10 of the fairing 8.

The front part 28 of the door is intended, in the closed door position, to overlap the downstream zone 16 of the fixed fairing part and extends as far as the annular part 9.

At the intersection of parts 25 and 28 of the internal wall of the door there is provided a shoulder 29 which, in the closed door position, abuts against the seal 17 so that the space 32 adjacent the front 28 of the door is isolated from the channel CA. Thus, in the closed door position shown with a continuous line in FIG. 2, the pressure P applied against the rear wall 25 of the door is the pressure reigning in the channel CA, whereas the pressure p applied to the front 28 of the door is that which reigns outside the propulsive power unit, i.e. a lower pressure.

The result is that the door is urged by this pressure difference into its closed position, which removes any risk of untimely opening of the door during flight.

Each pivoting door 13 is hinged about two pivots 33 carried by beams 11 and 11a and a link 34 is hinged on the one hand at 35 in a bearing 36 integral with the fixed structure 4 and on the other hand at 37 to the interal wall 25 of the door. Preferably, there exists a single link per door situated in the median plane thereof and extending through the channel CA. The pivoting axis 35 is situated in the vicinity of the ring of fixed blades, whereas the axis 36 is situated substantially at a quarter (¼) of the length of the door from its rear edge 26.

Furthermore, the pivoting axis of the door passing through pivots 33 is situated substantially at a distance L corresponding to a half of the length of the door from its rear edge 26.

With these arrangements, under thrust reversal, jacks 19 cause the sliding part of the fairing to move back into the position shown with broken lines in FIG. 2, which through the links 34, causes automatic rotation of doors 13 which then occupy the broken line position and close the channel CA, freeing in the fairing a reversal well of considerable length PI and projecting outwardly for guiding the deflected flow.

We claim:

1. Aircraft propulsive power unit of the type comprising, on the one hand, a fixed central structure along the axis of which is housed a gas generator whose nozzle delivers a hot jet and, on the other hand, an upstream fan or blower concentric with the gas generator and rotating inside an annular channel defined by the fixed structure and by a peripheral cowling or fairing with double wall carried by the fixed structure, said blower providing the forced circulation of a cold flow in the channel for improving the performance of the power unit, the fairing being formed of two parts, the upstream one of which is fixed and surrounds the blower, whereas the downstream one is mobile and slides parallel to the longitudinal axis of the generator, said propulsive power unit further comprising a system for reversing the thrust of the cold flow which is formed of pivoting doors having respectively external and internal walls which, in the retracted position of the doors, are aligned respectively with the external and internal walls of the fairing, characterized in that said doors are housed in openings of the sliding part of the fairing, defined by annular parts joined together by beams, said doors pivoting about pivots housed in said beams and each door being coupled by at least one link to the fixed central structure so that the backward movement of the sliding part of the fairing causes rotation of the doors, which uncovers the openings and closes the annular channel, the doors projecting radially outwardly of the fairing.

2. Propulsive power unit according to claim 1, characterized in that translational movement of the sliding part of the fairing is provided by an actuating system housed partially in the fixed upstream part of the fairing and partially in the beams of the sliding part.

3. Propulsive power unit according to claim 1, characterized in that the coupling point of the link to the door is situated substantially at a quarter of the length thereof from its rear edge.

4. Propulsive power unit according to claim 1, characterized in that the pivoting axis of the doors is situated substantially halfway therealong.

5. Propulsive power unit according to claim 1, in which the fixed part of the fairing is connected to the fixed central structure by a series of fixed blades situated downstream of the blower, characterized in that, in the retracted position, i.e. with the doors aligned with the fairing, the rear part of the doors closes a space between the rear edge of the fixed part of the fairing and the annular downstream part of the sliding part of the fairing, whereas the front part of the doors covers a zone of the fixed part of the fairing.

6. Propulsive power unit according to claim 1, characterized in that the edge of the fixed fairing part is provided with a seal against which a shoulder, provided in the internal face of the door, is engagable by abutment.

7. Propulsive power unit according to claim 1, characterized in that, in the retracted position, the rear part of the internal face of the door is aligned with the internal wall of the fixed fairing part providing material continuity of the annular channel.

8. Propulsive power unit according to claim 1, characterized in that the edge of the fixed fairing part is provided with a seal against which a shoulder provided in the internal face of the door is engagable by abutment and in that in the retracted position, the pressure reigning in the annular channel is exerted on the rear part of the door whereas, on the front part of the door isolated by the seal there reigns a lower pressure, this pressure difference acting in the direction of holding the doors in the closed position.

* * * * *